Dec. 20, 1960 R. A. JEROTHE 2,965,018
FILM EMBOSSING ROLL
Filed Feb. 6, 1957

INVENTOR.
RUDOLPH A. JEROTHE
BY
Oldham & Oldham
ATTYS.

United States Patent Office 2,965,018
Patented Dec. 20, 1960

2,965,018

FILM EMBOSSING ROLL

Rudolph A. Jerothe, Pines Lake, N.J., assignor to Toscony, Inc., Passaic, N.J., a corporation of New York Filed Feb. 6, 1957, Ser. No. 638,495

2 Claims. (Cl. 101—31)

This invention relates to film-embossing rolls and is especially useful in the manufacture and construction of rolls for embossing vinyl film and sheeting or other film material.

In the manufacture of film materials, it is often desirable to emboss the material to provide a pleasing decorative appearance. Such embossing processes usually require pressing the material progressively by use of an embossing roll having the desired surface. Such rolls are generally made by expensive machining processes which involve milling, punching and engraving operations, or by processes in which portions of the roll surface are etched away by chemical processes.

It is an object of the present invention to provide a roll having a rugose surface at low cost.

Another object of the invention is to provide a roll having good heat conductivity.

A further object is to form an irregular surface of thermoplastic material about the face of a roll and to then form a protective layer of sprayed metal thereabout.

Still another object is to form a layer of thermoplastic material upon a roll face and to embed objects of heterogeneous size and shape in the thermoplastic material to provide an embossing surface.

These and other objects will appear from the following description and the accompanying drawings forming a part hereof.

Figure 1:
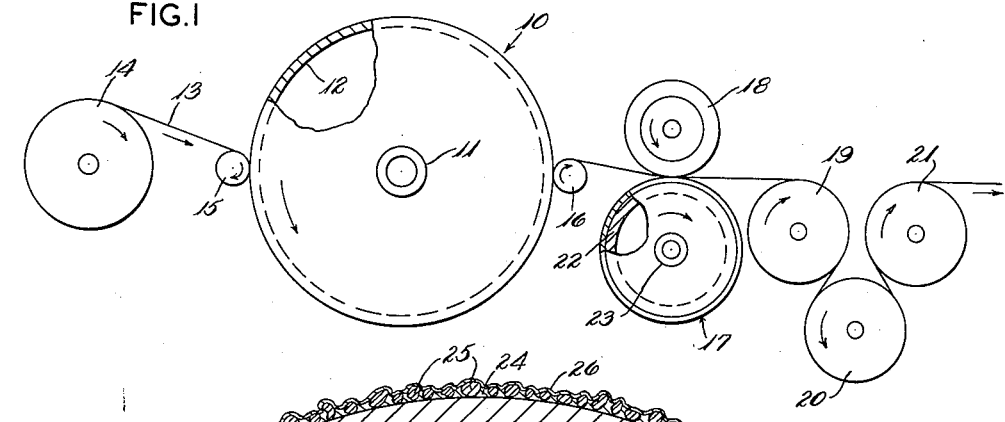
Fig. 1 is a diagrammatic view of an embossing train including the roll of this invention.

Referring to the drawings, and first to Fig. 1, thereof, the numeral 10 designates a heating drum rotatable about trunnions such as 11, the trunnions being hollow to communicate with the interior 12 of the hollow drum. Means (not shown) are provided for rotating the drum and steam or other heating fluid is circulated through the drum.

A sheet 13 of vinyl film or film coated material is drawn from a supply roll 14 and about a guide roll 15 into contact with the heated drum 10. After being heated by passing about one half of the drum, the film is drawn over a guide roll 16 and between an embossing roll 17 and a resilient pressure roll 18 where it is embossed. The material then passes about a series of cooling drums 19, 20, 21 where it is cooled.

Figure 2:
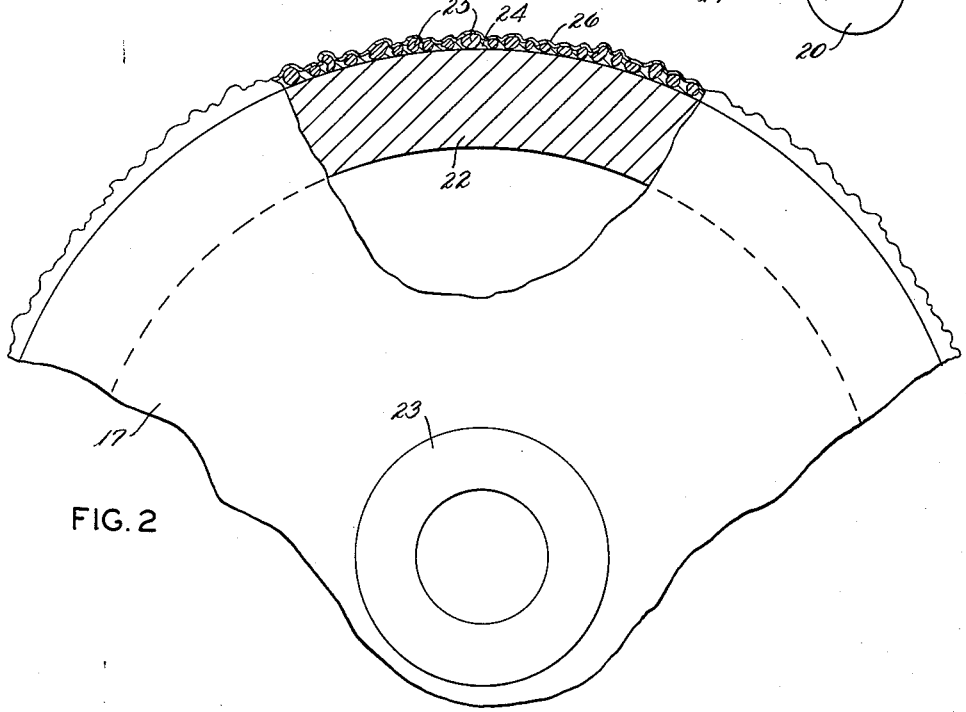
Fig. 2 is an end view of the embossing roll of the invention part of the roll being broken away and part shown in section to show its construction.
Figure 3:
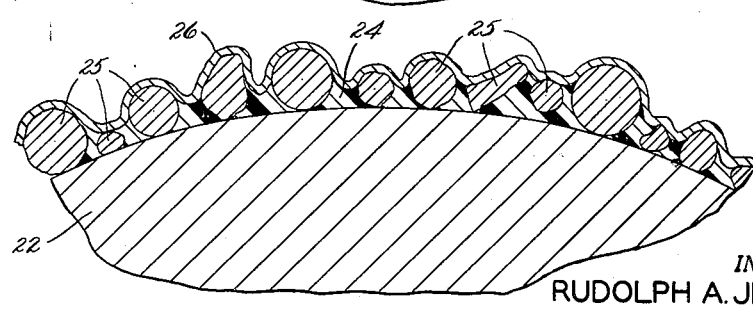
Fig. 3 is an enlarged sectional view of a portion of the embossing roll.

The embossing roll 17 is shown more clearly in Figs. 2 and 3 and comprises a hollow cylindrical wall 22 of heat conductive metal supported by hollow trunnions 23 through which cooling or heating fluids may be circulated by means of slip pipe connections (not shown). The outer surface of the roll body of metal is provided with a layer 24 of heat-resistant thermoset plastic material such as epoxy resin adhered to the metal roll surface. Embedded in the plastic layer 24 are a multiplicity of small bodies or particles 25 of heterogeneous sizes and/or shapes. These bodies or particles may be of regular or irregular mathematical shapes and are preferably of irregular shape and irregularly arranged.

The bodies or particles 25 may be of any material having sufficient rigidity or resistance to deformation as to hold their shape under pressure applied to the embossing roll but are preferably of relatively rigid heat conductive metal or other heat conductive material.

Preferably, the bodies or particles 25 are in heat conductive contact with the surface of the metal wall 22 so as to act as heat conductors but may be separated therefrom by a film of the embedding material. In its preferred form, a large percentage of the bodies or particles 25 are of greater diameter at least in one direction than the average thickness of the layer of embedding plastic so that they form bumps, warts or irregularly rounded projections on the surface of the plastic layer in which the plastic may or may not cover all their humped portions.

To provide greater resistance to wear, the outer surface of the plastic material with the embedded bodies or particles is completely covered by a conforming protective layer 26 of metal of relatively uniform thickness. While this metal protective layer might be formed by electrodeposit or by other means, it is preferred to form this layer from sprayed metal as the layer of metal so provided has a slightly rough surface free from polish. The metal layer may be sprayed upon the plastic layer, the hot particles of metal becoming adhered to the plastic and with the irregular projections formed by the bodies or particles 25 providing an irregular embossing surface of warty or rugose appearance.

In providing the embossing surface upon a smooth faced roll, a thin coating of epoxy resin or other suitable thermoplastic material of from .005" to .025" may be applied to the wall 22 of the roll and the bodies or particles 25 may be rolled into, dropped upon or projected against the coated surface. Thereafter, a second coating of the thermoplastic material may be sprayed or otherwise be applied over the embedded particles, if desired, although this is not necessary.

The assembled materials on the roll face may be pressed thereon if desired by applying a resilient faced roll, such as the roll 18 thereto under pressure while the roll 17 is rotated thereagainst. Whether or not the assembled layer is further compressed, heat is applied to thermoset the plastic material to form a permanent matrix in which the bodies or particles 25 are embedded and preferably are exposed at the outer face above the plastic layer. As the larger particles contact the body of the metal roll and are exposed to contact the metal wear-resisting layer, they provide conductive paths for heat between the shell of the roll and the wear-resisting metal layer.

The wear-resisting layer of metal is preferably formed by spraying hot metal onto the surface to a thickness of from .003" to .010".

While it is preferred to form an embossing surface by embedding bodies or particles in a layer of thermoplastic material about a roll face, the surface of the plastic layer might also be formed as an embossing surface by engraving or modeling the plastic material in place on the roll face as by rolling and pressing it against a coarse fabric or other impression surface. However, the surface produced by depositing objects or particles of conductive material in the plastic layer has the advantage of providing an embossing surface in which the conductive objects or particles provide great strength against crushing and also provide conductivity from the metal wear resisting surface to the metal roll core.

While a certain representative embodiment and details have been shown for the purpose of illustrating the invention, it will be apparent to those skilled in the art that

I claim:

1. A roll for embossing plastic film and including a hollow cylindrical body of heat transferable metal, a layer of heat resistant thermosetting plastic covering the outer surface of the body, heat transferable metal particles of abrasive grit-like shape positioned at random in the plastic, a large plurality of the particles extending down through the plastic into heat transfer engagement with the cylindrical body and also extending radially outward of the surface of the plastic, and a heat transferable metal layer of substantially uniform thickness covering the plastic and in heat transfer engagement with the exposed radially outer surfaces of the particles, said metal layer being of less radial thickness than the plastic.

2. A roll for embossing plastic film and including a hollow cylindrical body of heat transferable metal, a layer of heat resistant thermo-setting plastic covering the outer surface of the body, heat transferable metal particles positioned at random in the plastic, a large plurality of the particles extending down through the plastic into heat transfer engagement with the cylindrical body and also extending radially outward of the surface of the plastic, and a heat transferable metal layer of substantially uniform thickness covering the plastic and in heat transfer engagement with the exposed radially outer surfaces of the particles.

References Cited in the file of this patent

UNITED STATES PATENTS

| | | |
|---|---|---|
| 292,572 | Parker | Jan. 29, 1884 |
| 615,703 | Hofmeier | Dec. 13, 1898 |
| 793,315 | McIndoe | June 27, 1905 |
| 970,932 | Kruger | Sept. 20, 1910 |
| 1,379,432 | Yeoell | May 24, 1921 |
| 1,688,645 | Novotny | Oct. 23, 1928 |
| 1,769,363 | Arvidson | July 1, 1930 |
| 2,469,620 | Wimpfheimer | May 10, 1949 |
| 2,555,319 | Cross | June 5, 1951 |
| 2,752,632 | Winstead | July 3, 1956 |
| 2,793,585 | Granitsas | May 28, 1957 |